United States Patent [19]

Bergna

[11] Patent Number: 4,677,084

[45] Date of Patent: Jun. 30, 1987

[54] ATTRITION RESISTANT CATALYSTS, CATALYST PRECURSORS AND CATALYST SUPPORTS AND PROCESS FOR PREPARING SAME

[75] Inventor: Horacio E. Bergna, Wilmington, Del.

[73] Assignee: E. I. Du Pont de Nemours and Company, Wilmington, Del.

[21] Appl. No.: 802,304

[22] Filed: Nov. 27, 1985

[51] Int. Cl.[4] ............................................. B01J 35/08
[52] U.S. Cl. ................................................... 502/8
[58] Field of Search ................................. 502/8, 9, 10

[56] References Cited

U.S. PATENT DOCUMENTS

| | | | |
|---|---|---|---|
| 3,044,965 | 7/1962 | Callahan | 502/212 |
| 3,867,308 | 2/1975 | Elliott | 252/455 Z |
| 3,972,835 | 8/1976 | Hoffman et al. | 252/455 Z |
| 4,014,927 | 3/1977 | Kadowaki | 502/243 X |
| 4,317,778 | 3/1982 | Blum et al. | 502/209 X |
| 4,525,471 | 6/1985 | Bremer et al. | 502/209 |
| 4,567,030 | 1/1986 | Yuasa et al. | 502/10 X |

*Primary Examiner*—W. J. Shine

[57] ABSTRACT

This invention relates to highly attrition resistant catalysts, catalyst precursors and catalyst supports and to processes for making and using them.

8 Claims, 13 Drawing Figures

FIG. 1
FIG. 1A
FIG. 1B
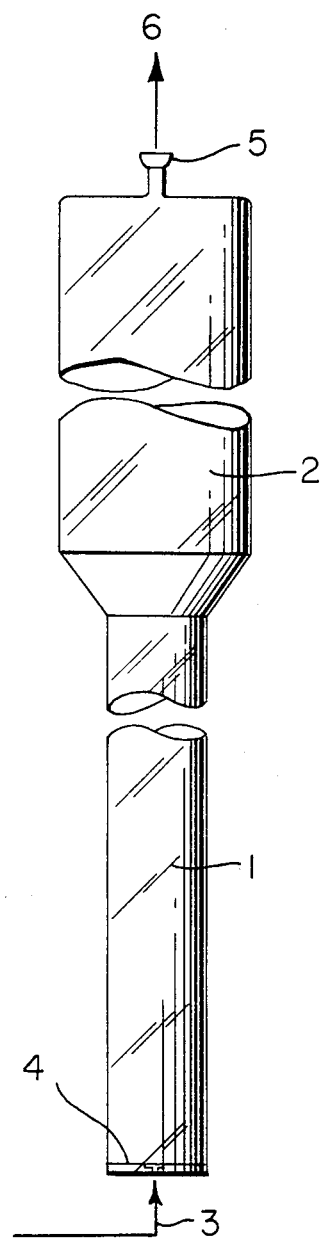
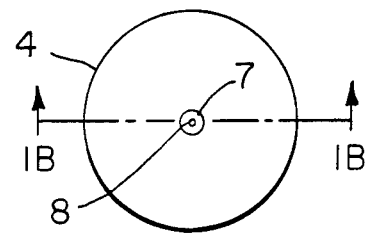
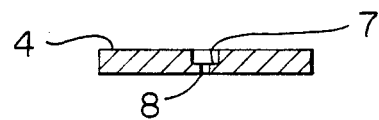

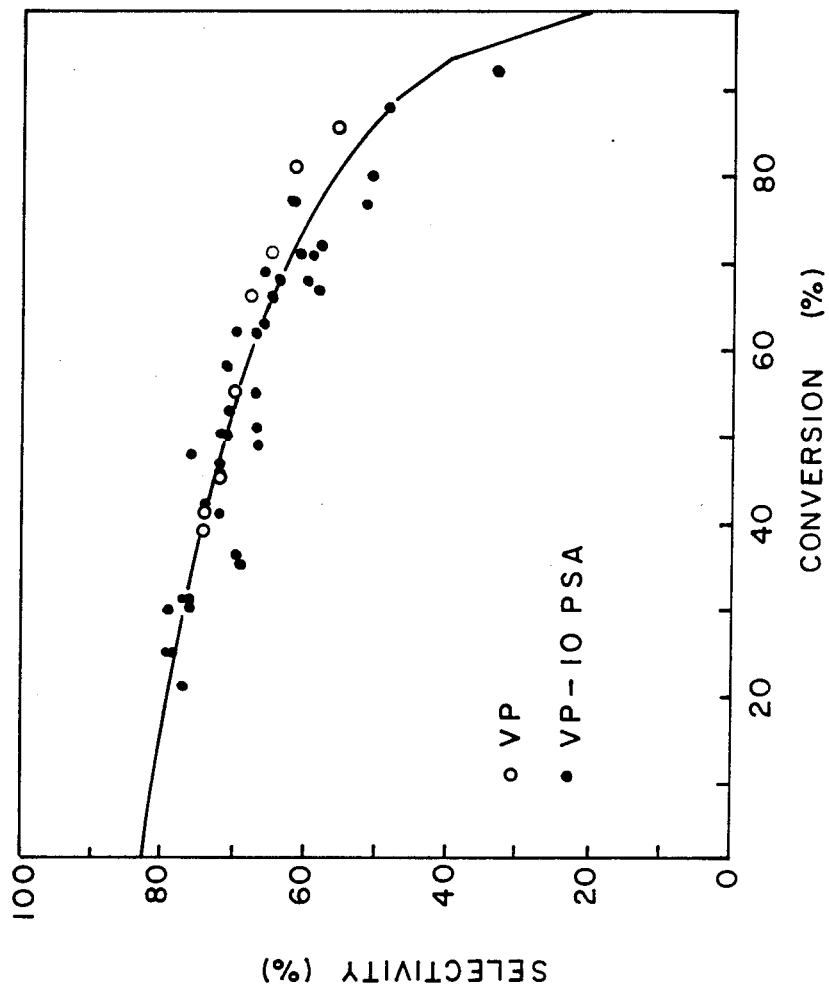

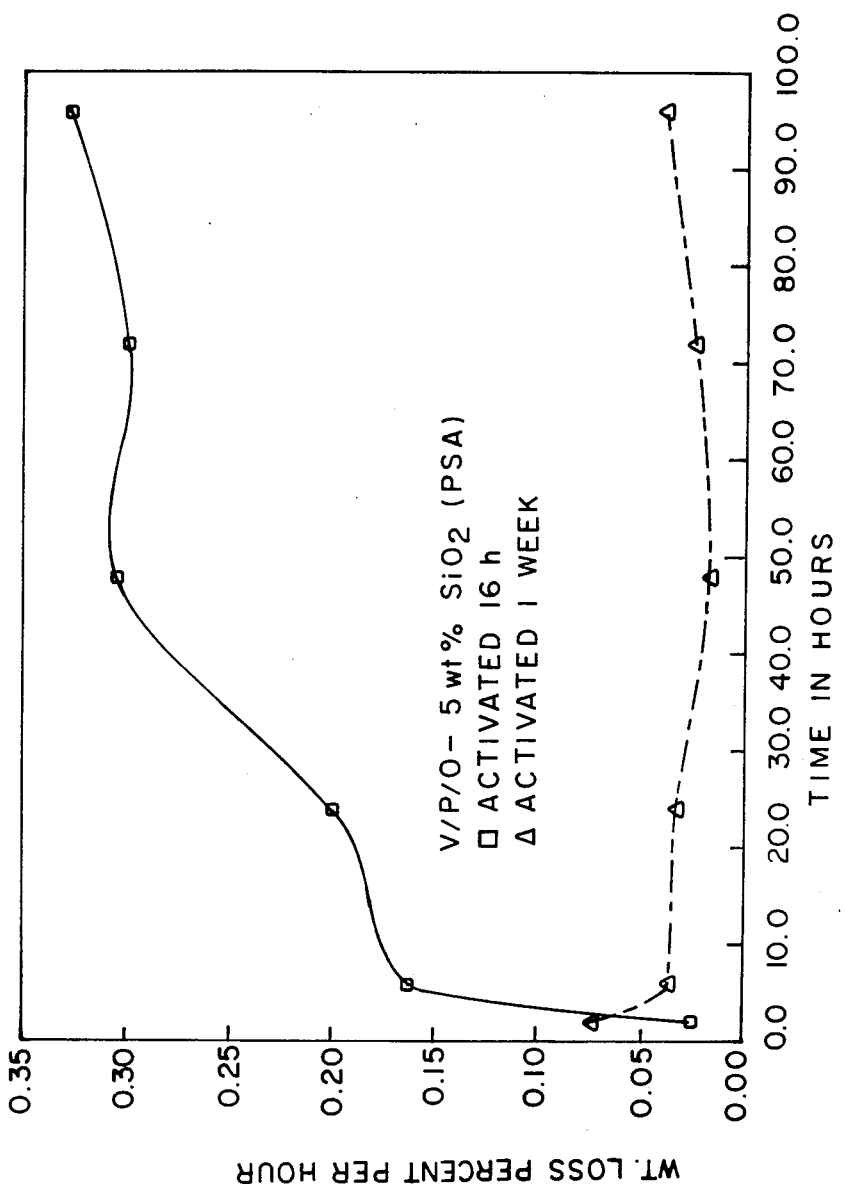

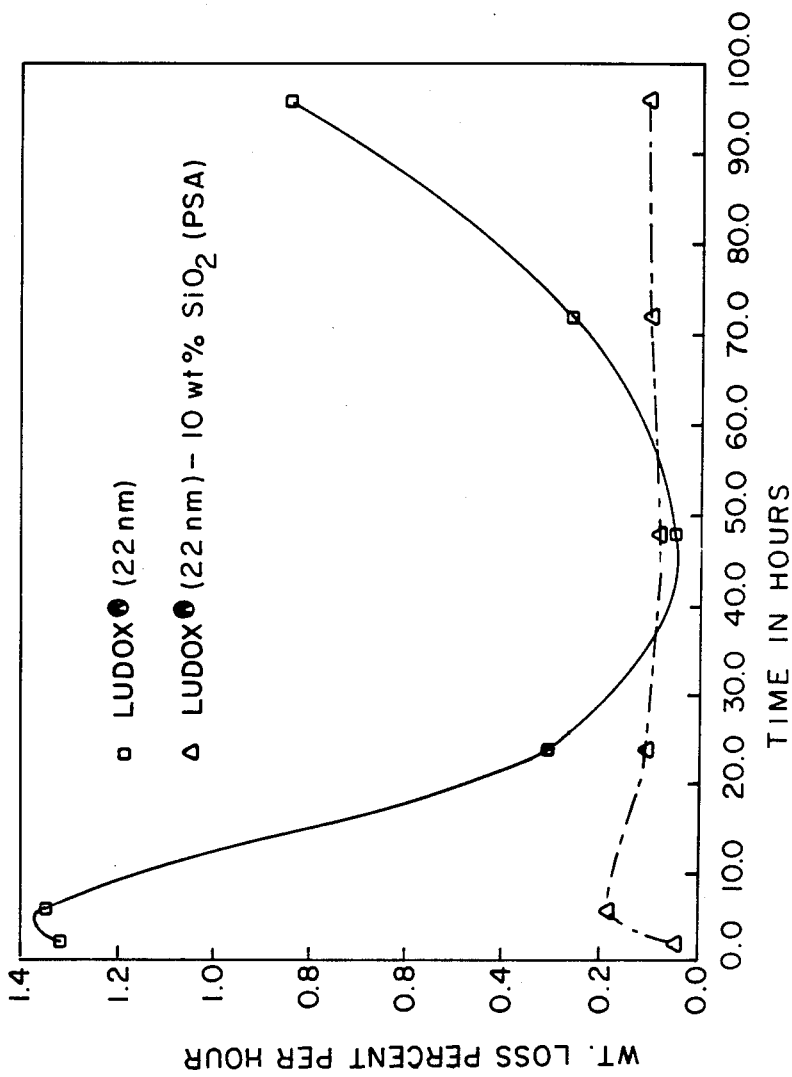

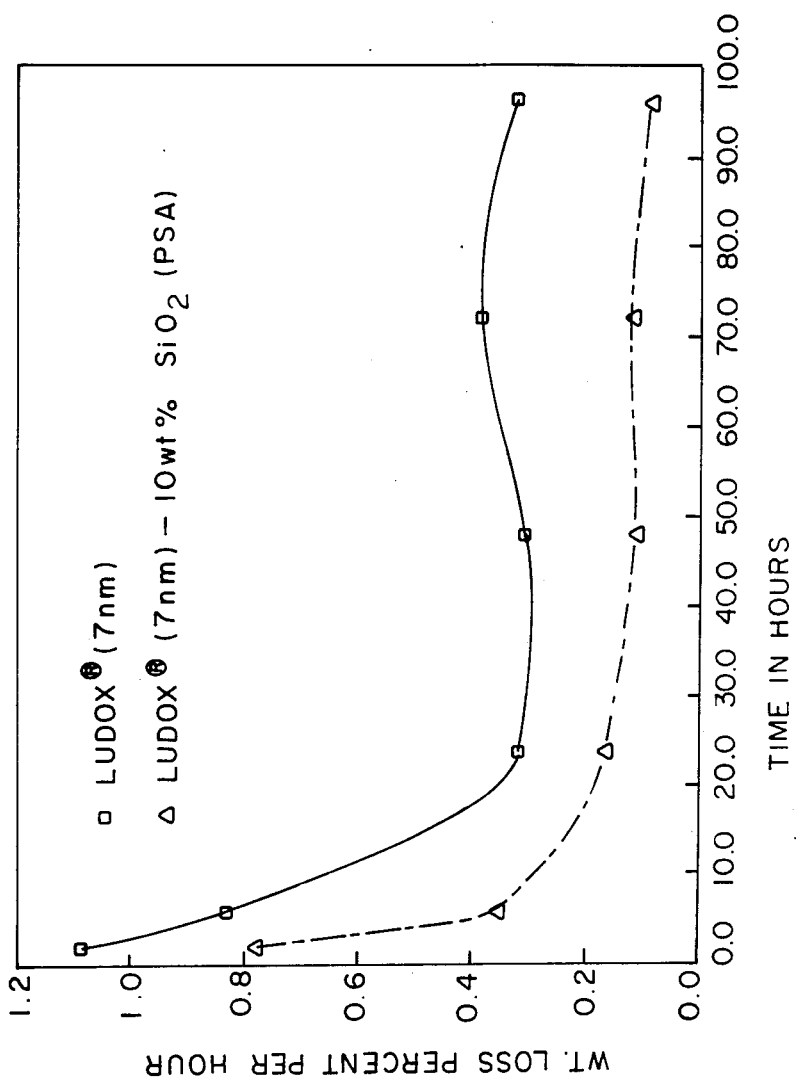

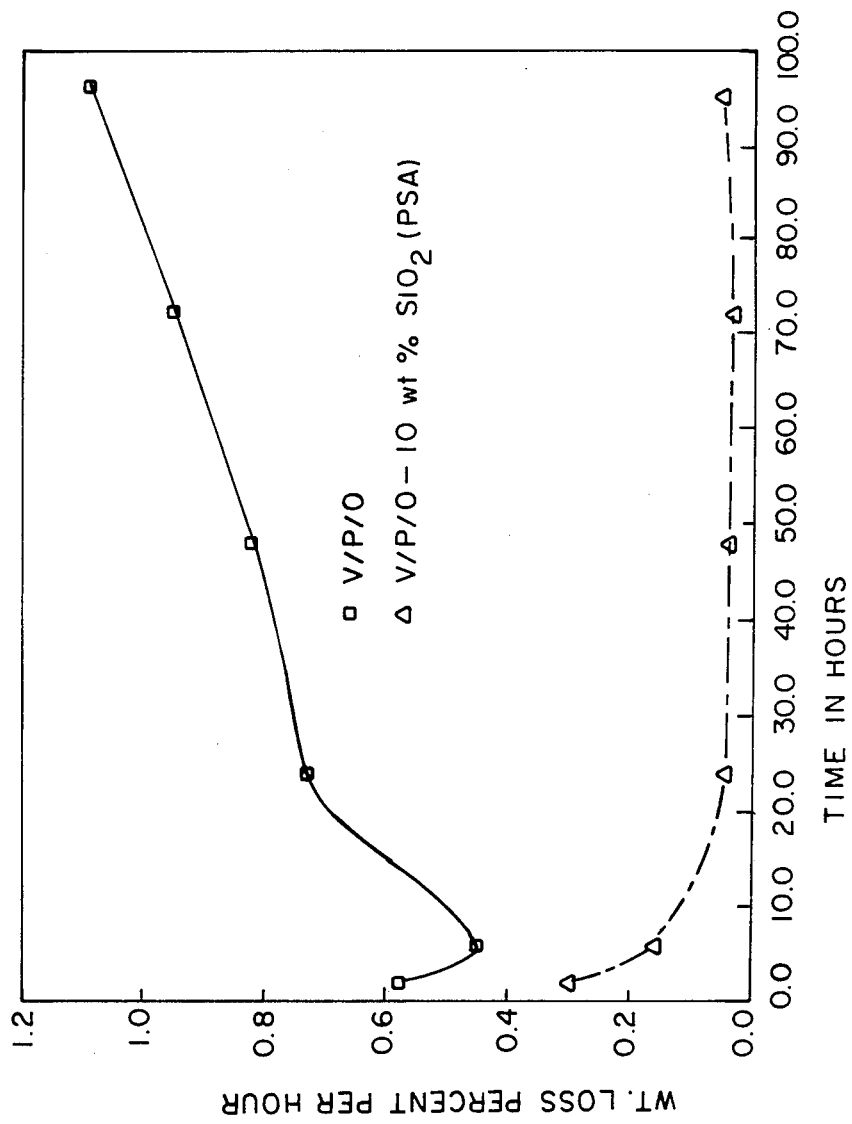

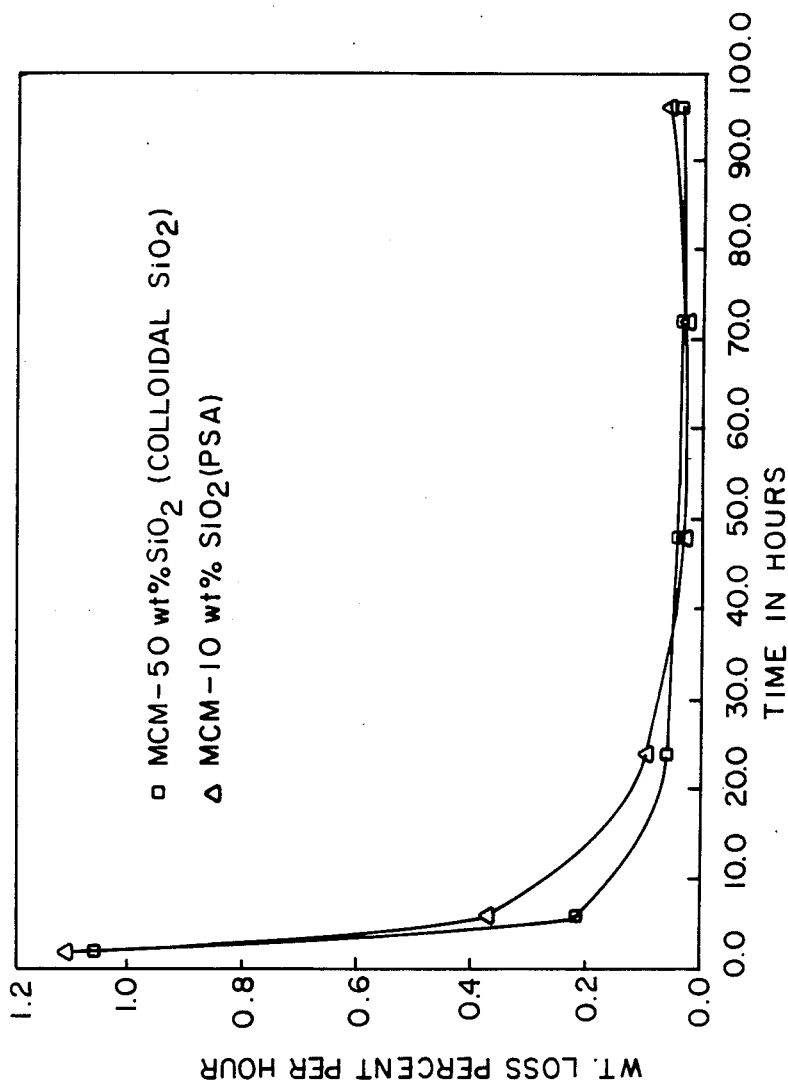

ATTRITION RESISTANT CATALYSTS, CATALYST PRECURSORS AND CATALYST SUPPORTS AND PROCESS FOR PREPARING SAME

BACKGROUND OF THE INVENTION

1. Field of the Invention

This invention relates to highly attrition resistant catalysts, catalyst precursors and catalyst supports and to processes for making and using them.

2. Background

The use of silica as a support for catalysts or as a binder for catalyst particles is well known. The silica provides strength and attrition resistance and it acts to disperse the catalyst particles.

U.S. Pat. No. 2,904,580 discloses a process for producing acrylonitrile from propylene in a fluid bed reactor using a catalyst consisting essentially of bismuth phosphomolybdate supported on silica. The catalyst precursors in solution were added to an aqueous solution of an aqueous colloidal silica sol containing 30 wt % silica. U.S. Pat. No. 3,425,958 discloses a process for improving the flow properties of particulate silica (average particle size about 1 to 100 $\mu$m) by bringing the particulate silica into contact with a solution of silicic acid and removing the solvent from the silica. When a catalyst is to be deposited onto the particulate silica, the catalyst precursor and any catalyst additive required are added to the silicic acid solution along with the particulate silica and the solvent is then removed. Heating is disclosed as a convenient way to remove the solvent. U.S. Pat. No. 3,772,212 discloses a fluidized bed catalyst for production of aromatic nitriles, the catalyst comprises a vanadium oxide, a chromium oxide, and a boron oxide as catalyst components and silica as a carrier and is prepared by spray-drying a silica sol containing vanadium, chromium and boron compounds. An aqueous 30 wt % colloidal silica sol was used. U.S. Pat. No. 3,746,657 discloses a process for making a fluidized bed catalyst comprising an oxide of molybdenum and a supporting material derived from a colloidal sol of an oxide of silicon, aluminum, titanium or zirconium, said process comprising preparing a slurry of the catalyst components and spray drying the slurry. The silica sol employed is preferably a low alkali aqueous silica sol containing 30 to 50 wt % $SiO_2$. U.S. Pat. No. 3,044,965 discloses a process for making a fluidized bed catalyst consisting of bismuth silico-molybdate or bismuth silico-phospho-molybdate comprising forming a slurry of the appropriate metal compounds and silica and spray drying. A low alkali aqueous silica sol containing 30 wt % $SiO_2$ was used as the silica source. U.S. Pat. No. 4,014,927 discloses a process for the production of unsaturated acids by catalytic oxidation of the corresponding unsaturated aldehydes in the presence of molybdenum-vanadium-iron based catalysts prepared by forming a solution or slurry of source compounds of the above metals and a source of silicon such as a silicate, water glass, or colloidal silica, and then drying by either evaporation or spray drying. U.S. Pat. No. 4,092,354 discloses a process for producing acrylic acid by the gas phase oxidation of acrolein comprising contacting acrolein and molecular oxygen over a metal oxide catalyst containing Mo, V, Cu, and at least one of Fe, Co, Ni, and Mg. The catalyst carrier is chosen from a group of materials, including silica sol and silica gel. Catalyst precursors in solution are added to a silica sol containing 20 wt % $SiO_2$. The mixture is evaporated and then calcined.

U.S. Pat. No. 3,313,737 discloses a process for preparing an improved silica acid sol for use as a binder. The silicic acid sol is prepared from an alkyl silicate which is hydrolyzed by water in the presence of a mutual solvent by the catalytic action of a strong acid. These sols contain 10–30 wt % $SiO_2$. U.S. Pat. No. 3,920,578 discloses rapid-gelling binder vehicles produced by admixing a water-soluble, alkaline ionic silicate with a colloidal amorphous silica aquasol having a median particle diameter of 50 A to 0.5 $\mu$m. U.S. Pat. No. 3,894,964 discloses production of shaped bodies of zeolites of improved mechanical resistance (i.e., compression strength) using a silicic acid gel as a binder. The unstable silicic acid sol that is used has a silicic acid content greater than 10 wt %, usually 25–35 wt %, and a silicic acid surface area greater than 150 m²/g. U.S. Pat. No. 3,296,151 discloses a process for the production of substantially spherical, silica bonded, zeolitic molecular sieve granules comprising forming a suspension by adding powdery molecular sieve zeolite to an aqueous silica sol, said silica sol having a surface area of 150–400 m²/g on drying and said silica sol used in a concentration of 10 to 40 wt % $SiO_2$; forming a suspension of finely divided magnesium oxide; admixing the two suspensions to produce a product having 0.1–3 wt % MgO; introducing the mixed suspensions dropwise into a liquid which is immiscible with water, whereby spherical granules are formed by sol-gel conversion; and separating the granules from the liquid and drying the granules. U.S. Pat. No. 3,356,450 discloses a process for preparing substantially pure zeolite granules starting with zeolite particles bound with silicic acid. The silica sols used to make the starting particles have surface areas of 150–400 m²/g and at least 10 wt % $SiO_2$, and usually of the order of about 25 to about 35 wt % $SiO_2$. British Patent Specification No. 974,644 discloses a process for the production of molecular sieve pellets bonded with silicic acid, which comprises forming a plastic composition from a molecular sieve zeolite and an aqueous silica sol having a specific surface area between 150 and 400 m²/g and a $SiO_2$ concentration between 10 and 40% by weight. Preferably, the silica sol is produced by ion exchange of sodium silicate and subsequent thermal treatment at a pH of 9 to 10. The patent further discloses that it has also been proposed to use, as binding agents, silicic acid esters which are hydrolysed to silica gel by the water which is added to the mixture. The gels formed by the hydrolysis of the esters have a specific surface area of about 800 m²/g and consequently consist of extremely fine particles. The use of the silicic acid esters is said to be too expensive for practical use, but experiments to replace them by normal commercial stable aqueous silica sols with a specific surface area between 100 and 200 m²/g failed because the resulting granules had insufficient bonding strength and disintegrated.

U.S. Pat. No. 4,112,032 discloses a process for making porous silica-containing articles having pore diameters ranging between about 100 A and 1 $\mu$m by combining a silicate solution containing at least 20% $SiO_2$ and a colloidal silica solution containing 40 wt % $SiO_2$ and then adding an organic gelation agent. Particulate matter less than about 74 $\mu$m in diameter and selected from the group consisting essentially of alumina, titania, silica, zirconia, carbon, silicon carbide, silicon nitride, iron oxides, and catalytically active transition metal oxides can be added before the gelation agent to produce porous silica articles containing a powder phase dispersed therein. U.S. Pat. No. 3,629,148 discloses a process for making an attriton resistant iron-containing catalyst from a bismuth phosphomolybdate catalyst by forming a mixture of the prescribed ingredients in a silca dispersion and spray drying. The silica dispersion contained 30 wt % $SiO_2$. U.S. Pat. No. 4,453,006 discloses a two-step process for preparing attrition resistant supported solid oxidation catalysts containing any known elements, preferably those containing molybdenum and used for the vapor phase oxidation of propylene or isobutylene to prepare unsaturated aldehydes and acids. The process comprises adding fumed silica to a mixture containing one or more active ingredients of the catalyst, drying said mixture, adding to this mixture in solution a silica or silica-containing compound other than fumed silica, and drying and calcining the mixture. The amount of fused silica can be 5–95% of the total silica used, with 15–65% being preferred. The silica used in the second addition can be silica sol, silica gel, diatomaceous earth or any precursor to silica, such as silicate, that preferably has a surface area of 50 $m^2/g$ or more. The silica sols used in the Examples have silica contents of 40 wt %. U.S. Pat. No. 4,400,306 discloses a process for preparing supported attrition-resistant catalysts for fluid bed reactors by impregnating a preformed support, e.g., silica, but also alumina, alumina-silica, zirconia, and niobia, with a metal alkoxide of at least one metal selected from vanadium, molybdenum, antimony, copper, niobium, tantalum, zinc, zirconium, boron and mixtures thereof, and contacting the impregnated support with a solution of at least one additional catalyst component in situ, and drying the catalyst-containing support.

The preparation of mixed oxide compositions of vanadium and phosphorus and the use of these as catalysts for the oxidation of hydrocarbons such as n-butane to maleic anhydride is known in the art. In U.S. Pat. No. 4,111,963 the importance of reducing the vanadium used in a vanadium/phosphorus oxide (V/P/O) catalyst to the 4 oxidation state is described. Preferred is the use of concentrated hydrochloric acid as the reaction medium to bring about this reduction and preferred catalysts have a phosphorus to vanadium atom ratio of 1:2 to 2:1 and a porosity of at least 35%. In U.S. Pat. No. 3,864,280 the reduction of the vanadium in such a catalyst system to an average valence state of 3.9 to 4.6 is emphasized; the atomic ratio of phosphorus to vanadium is 0.9–1.8:1. Isobutyl alcohol is used as a solvent for the catalyst preparation, with the indication that an increase in catalyst surface area, over that obtained from use of an aqueous system, is achieved. The addition of promoters to the vanadium/phosphorus oxide catalyst compositions used for the oxidation of hydrocarbons to maleic anhydride is also disclosed in the art. Thus, in U.S. Pat. Nos. 4,062,873 and 4,064,070 are disclosed vanadium/phosphorus/silicon oxide catalyst compositions made in an organic medium. In U.S. Pat. Nos. 4,132,670 and 4,187,235 are disclosed processes for preparing high surface area vanadium/phosphorus oxide catalyst. Anhydrous alcohols of 1–10 carbon atoms and 1 to 3 hydroxyl groups are used to reduce the vanadium to a valence of 4.0 to 4.6. Also disclosed, as in U.S. Pat. Nos. 4,371,702 and 4,442,226, are vanadium/phosphorus oxide catalysts containing the promoter comprising silicon and at least one of indium, antimony and tantalum, the Si/V atom ratio being in the range 0.02–3.0:1.0, the (In +Sb +Ta)/V atom ratio being in the range 0.005–0.2:1.0 and the P/v atom ratio being in the range 0.9–1.3:1.0, said catalyst being prepared in an aqueous or organic liquid medium by the procedure wherein the appropriate vanadium species substantially of valence +4 is contacted with the promoter or promoter precursors and thereafter with the appropriate phosphorus species.

The attrition resistance of the vanadium/phosphorus oxide catalyst is particularly important when the oxidation process is carried out in a fluid bed or recirculating solids reactor. U.S. Pat. Nos. 4,317,778, 4,351,773, and 4,374,043 disclose processes for preparing fluid bed vanadium/phosphorus oxide catalysts in which an aqueous slurry of comminuted catalyst precursor is spray dried. Preferably, the catalyst precursor is uncalcined when it is made into a slurry. Examples are given in which an aqueous slurry of the catalyst precursor and a silica sol is spray dried to provide the catalysts 80 wt % V/P/O-20 wt % $SiO_2$ and 70 wt % V/P/O-30 wt % $SiO_2$. The products are described as uniform, microspheroidal catalyst particles. U.S. Pat. No. 4,127,591 discloses a process for preparing fluid bed vanadium/phosphorus oxide catalysts containing potassium and iron in which an aqueous slurry of the catalyst precursor is spray dried. Examples are given in which an aqueous slurry of the catalyst precursors in solution and a silica sol, 20 wt % silica, is spray dried to provide the catalyst 65 wt % V/P/K/Fe/O-35 wt % $SiO_2$. Silica content of the catalyst is to be between 25 and 70 wt %. British Patent Specification No. 1,285,075 discloses a process for preparing attrition-resistant vanadium/phosphorus oxide catalysts for fluid bed reactors by spray drying a mixture of a vanadium compound, a phosphorus compound, and an aqueous silica sol. The silica sols used in the Examples contained 30–35 wt % $SiO_2$. British Patent Specification No. 2,118,060 discloses a process for preparing a catalyst comprising oxides of vanadium and phosphorus by mixing two crystalline oxides, each containing vanadium and phosphorus and each with a specified X-ray diffraction pattern, with a silica sol, spray drying the resultant slurry, and calcining the particles obtained. The silica sols used were 20–40% silica sol solutions and 40% colloidal silica solutions. U.S. Pat. Nos. 4,062,873 and 4,064,070 disclose processes for preparing a catalyst comprising oxides of vanadium, phosphorus, and silicon by coprecipitating vanadium oxide and silica or a silica precursor. Phosphorus can be coprecipitated with the vanadium oxide and silica or silica precursor or added later to form the catalyst precursor, which is then calcined to give the silica-containing catalyst. The catalysts of the Examples contain 0.7–5.3 wt % silica which is distributed uniformly throughout the pellet. Russian Patent No. 215,882 discloses a method for preparing a vanadium/phosphorus oxide catalyst which is said to have increased activity and increased mechanical strength. Industrial large-pore silica gel is impregnated with a heated solution of oxalic acid, phosphoric acid, and vanadium pentoxide, dried, and activated. U.S. Pat. No. 4,388,221 discloses a process for preparing vanadium/phosphorus oxide Sn-containing catalysts comprising mixing the catalyst precursor, a binder, solvent and mordenite to form an impregnated mordenite which is then calcined. Silica is one of the suggested binders and the binder is said to comprise 0 to 10 wt % of the finished composite catalyst.

5

The objective of this invention is to provide a method for making attrition resistant catalysts, catalyst precursors and catalyst supports.

SUMMARY OF THE INVENTION

This invention provides attrition resistant catalyst, catalyst precursor and catalyst support particles and the process of their preparation comprising (a) forming a slurry comprised of catalyst, catalyst precursor or catalyst support particles dispersed in a solution of a solute which consists essentially of an oxide precursor of particle size no greater than 5 nm, the relative amounts of the particles and oxide precursor chosen so that the weight of the oxide formed in steps (b) and/or (c) is about 3-15% of the total weight of the particles and the oxide, (b) spray drying the slurry to form porous microspheres of attrition resistant catalyst, catalyst precursor or catalyst support particles, and (c) calcining the spray dried microspheres at an elevated temperature which is below the temperature which is substantially deleterious to the catalyst or catalyst support, to produce attrition resistant catalyst or catalyst support particles.

The preferred solvent is water, the preferred oxide is $SiO_2$, and the preferred solute is silicic acid, a precursor to anhydrous silica. The process of such preferred embodiments comprises (a) forming a slurry comprised of catalyst, catalyst precursor or catalyst support particles dispersed in an aqueous silicic acid solution equivalent to a weight of $SiO_2$ not exceeding about 6 wt %, the relative amounts of the particles and silicic acid chosen so that the weight of the $SiO_2$ formed is about 3-15% of the total weight of the particles and the $SiO_2$, (b) spray drying the slurry to form porous microspheres of attrition resistant catalyst, catalyst precursor or catalyst support particles, and (c) calcining the spray dried microspheres at an elevated temperature which is below the temperature which is substantially deleterious to the catalyst or catalyst support, to produce attrition resistant $SiO_2$-containing catalyst or catalyst support particles.

Preferably, the silicic acid is polysilicic acid (PSA) having an equivalent concentration of $SiO_2$ not exceeding about 5 wt %; the catalyst, catalyst precursor or catalyst support particles are less than about 10 μm in diameter; the microporous spheroidal particles produced by spray drying have diameters of from about 10 μm to about 300 μm; and the relative amounts of particles to be spray dried and $SiO_2$ are chosen so that the weight of the $SiO_2$ is about 5-12% of the total weight of the particles and the $SiO_2$.

When this process is used for preparing attrition resistant vanadium/phosphorus oxide catalysts for the oxidation of hydrocarbons to maleic anhydride, using conventional procedures such as disclosed in the background section of this specification, the particles used to form the slurry of step (a) are vanadium/phosphorus oxide catalyst precursor particles with a particle size preferably from about 0.5 μm to about 10 μm and more preferably from about 0.5 μm to about 3 μm. As indicated above, the relative amounts of precursor particles to be spray dried and $SiO_2$ are preferably chosen so that the weight of the $SiO_2$ is about 5-12% of the total weight of the particles and the $SiO_2$. More preferably, the relative amounts of precursor particles to be spray dried and $SiO_2$ are chosen so that the weight of the $SiO_2$ is about 10% of the total weight of the particles and the $SiO_2$. Typically, the spray dried catalyst precursor particles are calcined in stagnant air or in a low flow of air at about 375-400° C. for about 1 to 6 hours and then activated.

This invention also provides a process for preparing attrition resistant, $SiO_2$-containing vanadium/phosphorus oxide catalyst precursor particles comprising (a) forming a slurry comprised of vanadium/phosphorus oxide catalyst precursor particles dispersed in an aqueous silicic acid solution equivalent to a weight of $SiO_2$ not exceeding about 6 wt %, the relative amounts of the particles and silicic acid chosen so that the weight of the $SiO_2$ formed is about 10-15% of the total weight of the particles and the $SiO_2$, and (b) spray drying the slurry to form porous microspheres of attrition resistant, $SiO_2$-containing vanadium/phosphorus oxide catalyst precursor particles.

The invention also provides uses for the aforesaid attrition resistant catalyst, catalyst precursor and catalyst support particles.

BRIEF DESCRIPTION OF THE FIGURES

FIG. 1 shows the attrition mill used for the determination of attrition.

FIGS. 1A and 1B are views of a disc held in place at the bottom of the mill to retain the catalyst.

FIG. 2 is a plot of selectivity versus conversion for V/P/O catalyst—10 wt % $SiO_2$(PSA).

FIG. 3 shows the results of attrition mill tests for V/P/O catalyst—5 wt % $SiO_2$(PSA). Weight loss percent per hour is plotted versus time in hours.

FIG. 4 shows the results of attrition mill tests for Ludox ® (22 nm) catalyst support and for Ludox ® (22 nm)—5 wt % $SiO_2$(PSA) catalyst support. Weight loss percent per hour is plotted versus time in hours.

FIG. 5 shows the results of attrition mill tests for Ludox ® (7 nm) catalyst support and for Ludox ® (7 nm)—5 wt % $SiO_2$(PSA) catalyst support. Weight loss percent per hour is plotted versus time in hours.

FIG. 6 shows the results of attrition mill tests for V/P/O catalyst—10 wt % $SiO_2$(PSA) and for V/P/O catalyst. Weight loss percent per hour is plotted versus time in hours.

FIG. 11 shows the results of attrition mill tests for a multicomponent molybdate catalyst—10 wt % $SiO_2$(PSA) and a multicomponent molybdate catalyst containing about 50 wt % $SiO_2$(colloidal silica), said $SiO_2$ dispersed substantially uniformly throughout the composite particles. Weight loss percent per hour is plotted versus time in hours.

DETAILED DESCRIPTION OF THE INVENTION

Figure 7:
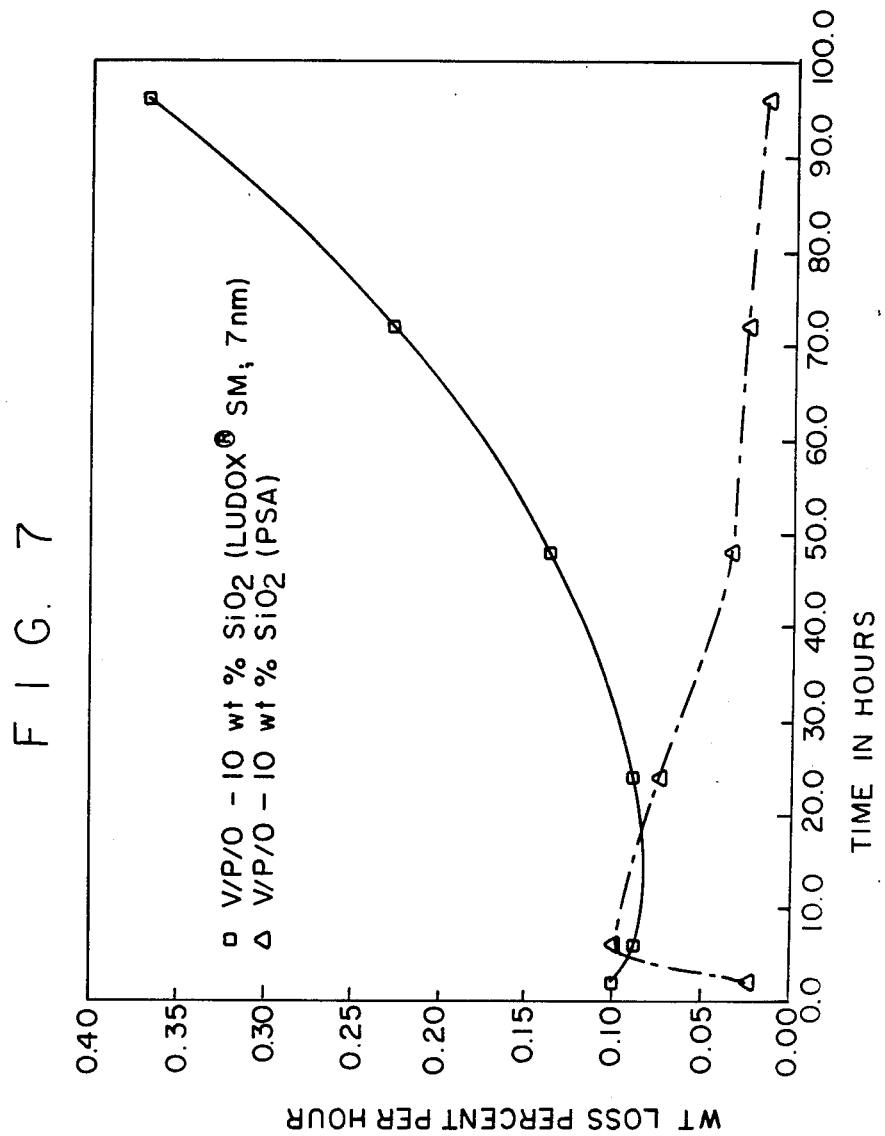
FIG. 7 shows the results of attrition mill tests for V/P/O catalyst—10 wt % $SiO_2$(7 nm particle size Ludox ® SM) and V/P/O catalyst—10 wt % $SiO_2$(PSA). Weight loss percent per hour is plotted versus time in hours.

For further comprehension of the invention, and of the objects and advantages thereof, reference may be made to the following description and to the appended claims in which the various novel features of the invention are more particularly set forth.

Supplementary to the aforesaid summary, the process of this invention comprises forming a sufficiently stable slurry comprised of catalyst, catalyst precursor or catalyst support particles dispersed in a solution of a solute which consists essentially of an oxide precursor, spray drying the slurry to form porous microspheres, and calcining the spray dried microspheres. This process results in the formation of an oxide-rich layer at the periphery of each calcined microsphere. This oxide-rich surface layer is typically 5–10 $\mu$m thick and contains substantially all the oxide provided by the oxide precursor solute. Since substantially all of the oxide is in the peripheral layer, good attrition resistance is attained with a small amount of oxide, i.e., the weight of the oxide is about 3–15%, preferably about 5–12% (except as noted above for the $SiO_2$-containing V/P/O catalyst), of the total weight of the spray dried particle. The oxide must be chosen so that it has no deleterious effect on the catalytic performance of the particular catalyst being used. The oxide can be inert or show catalytic activity for the particular process being run. When an attrition resistant catalyst is prepared, it is found that this peripheral layer does not affect the microstructure and phase development of the catalytically active phase during the calcination and activation steps and the morphology of the microspheres is such that it allows the reactants access to the catalytically active phase. This oxide-rich layer has no deleterious effect on catalyst performance.

The slurry which is spray dried in the process of this invention is comprised of catalyst, catalyst precursor or catalyst support particles dispersed in a solution of a solute which consists essentially of an oxide precursor. The catalyst, catalyst precursor or catalyst support particles used may be obtained by synthesis or by comminuting larger particles of crystalline, polycrystalline or mixed amorphous and crystalline phases. Typically these particles are of the order of about 0.5 to about 10 $\mu$m in size. It is preferred to use particles that are of the order of about 0.5 to about 3 $\mu$m. Examples of types of comminuted particles are those of the catalyst precursor of the V/P/O catalyst for known maleic anhydride processes, those of a multicomponent molybdate catalyst for known acrylonitrile processes, and those of the catalyst support alpha alumina. Other such particles include those of fused silica, kaolin, amorphous aluminosilicates, zeolites, zirconia, and titania. The particles used may also be fine particles such as the amorphous particles of 7 to 200 nm in diameter found in colloidal silica which can be used to form catalyst support particles. Aggregated amorphous silica powders can also be used for this purpose.

The solvent used in the slurry is a solvent for the oxide precursor. Water is preferred. The solute consists essentially of an oxide precursor of subcolloidal particle size. "Subcolloidal particles" (size) are defined herein as particles for which the largest dimension is no greater than 5 nm. The solute particles must not aggregate, precipitate or gel during or following the formation of the solution or in contact with the catalyst, catalyst precursor or catalyst support particles. The solute particles must provide a sufficiently stable solution and slurry to permit spray drying. Because the solute particles with the above properties are much smaller than the voids or spaces between the catalyst, catalyst precursor or catalyst support particles, when the slurry is spray dried, the solute particles can flow with the solvent from the interior to the peripheral region of the porous microsphere formed by evaporation of the solvent in a droplet of the spray. These solute particles then remain in this peripheral region as the drying is completed and form a hard peripheral composite shell of catalyst, catalyst precursor or catalyst support particles and oxide. The oxide can be chosen from the group comprising $SiO_2$, $Al_2O_3$, $P_2O_5$, $TiO_2$, $ZrO_2$, $MgO$, $Cr_2O_3$ and rare earth oxides. Examples of solutes for these oxides are silicic acid, basic aluminum chloride, phosphoric acid, titanyl oxychloride, hydrolyzed zirconyl nitrate, magnesium acetate, hydrolyzed basic chromic chloride ($Cr(OH)_2Cl_4$) and hydrolyzed basic nitrates of rare earths. The preferred oxide is $SiO_2$ and the preferred solute or oxide precursor is silicic acid, especially polysilicic acid.

The method of removing the liquid from the slurry is critical. Spray drying determines the distribution of the oxide in the dry particles of oxide and catalyst, catalyst precursor or catalyst support to provide the product of this invention. The spray drying may be carried using conventional spray drying techniques and equipment. The chamber product from the chamber of the spray dryer is typically made up of porous spheroidal particles with diameters of about 30 to about 300 $\mu$m. The cyclone product collected from the cyclone of the spray dryer is made up of porous spheroidal particles with somewhat smaller diameters. These spray dried particles may be sieved to obtain a fraction of particles with a narrower size distribution. The spray dried spheroidal particles are referred to herein as microspheres. As is well-known in the spray drying art, many of the porous microspheres produced have a void in the center with one or two openings to the outside. Such particles are referred to in the art as Amphora I-type and Amphora II-type particles, respectively.

The spray dried porous microspheres are then calcined. Regardless of whether the spray dried particles are comprised of oxide and catalyst, catalyst precursor or catalyst support, sintering is almost always necessary in order to achieve high attrition resistance. When the spray dried particles are comprised of oxide and catalyst precursor, calcining not only results in sintering but also generates the catalyst. Calcination conditions, such as temperature, time, and type of atmosphere, depend on the composition of the catalyst or catalyst support and the amount and nature of the oxide used. The calcination temperature must be sufficiently high to result in sintering and, when catalyst precursor is present, in catalyst generation, but it must be below temperatures deleterious to the catalyst or catalyst support. Some catalysts are subjected to an activation process before use. Activation can be carried out as part of the calcination process or subsequent to it.

The aqueous silicic acid solution that is useful in this invention contains silica of the proper particle size, i.e., no greater than 5 nm, and provides a solution of sufficient stability to allow the formation of the slurry and subsequent spray drying. The silicic acid can be in the form of a monomer or in the form of low molecular weight polymeric units. For a review of the characteristics of silicic acid, see R. K. Iler, *The Chemistry of Silica*, John Wiley and Sons, N.Y., 1979. Monomeric silicic acid Si(OH)$_4$ has never been isolated. It is a very weak acid and exists only in dilute aqueous solutions. At a concentration greater than about 100-200 ppm as SiO$_2$, the monomer polymerizes by condensation to form dimer and higher molecular weight species of silicic acid. The preferred form of silicic acid is polysilicic acid. For the purposes of this invention polysilicic acids are defined (following Iler, op. cit., p 287) as those silicic acids that have been formed and partially polymerized in the pH range 1-4 and consist of ultimate silica particles generally 7 smaller than 3-4 nm diameter. Polysilicic acid, i.e., oligomers of monosilicic acid, is comprised of polymers with molecular weights (as SiO$_2$) up to about 100,000, whether consisting of highly hydrated silica or dense spherical particles less than about 5 nm in diameter and generally smaller than 3-4 nm diameter. Polysilicic acid has sometimes been referred to in the literature as "active" silica.

The term polysilicic acid is justified, particularly in view of the very high specific surface area and the high proportion of SiOH groups. For particles with dimensions less than 5 nm, less than half of all the silicon atoms are present as SiO$_2$, that is, as silica, whereas more than half are each associated with at least one hydroxyl group. These silanol groups form silicon-oxygen-metal atom bonds with polybasic metal cations, as in the case of monosilicic acid. However, polysilicic acids differ from the monomer in that they form addition complexes with certain classes of polar organic molecules through hydrogen bond formation. Also, they can be isolated and esterified not only with alcohols under dehydrating conditions, but also with trimethylsilanol, even in aqueous solution.

Polysilicic acid made of 1.5-4 nm diameter discrete particles and having a pH of about 2.5-3.0 is not stable and gels at a relatively fast rate depending on concentration and temperature. Once a polysilicic acid solution has been exposed to alkaline conditions, it is rapidly converted to colloidal silica particles larger than 4-5 nm diameter. Thereafter, silica assumes different characteristics and can be stabilized as colloidal silica sols in the pH range 8-10. Thus, colloidal silica as opposed to polysilicic acid is made of highly polymerized species or particles generally larger than about 5 nm.

Aqueous solutions of polysilicic acid can be prepared by adding a thin stream of sodium silicate solution with an SiO$_2$:Na$_2$O ratio of 3 25:1.0 into the vortex of a violently stirred solution of H$_2$SO$_4$ kept at 0-5° C, stopping the addition when the pH rises to about 1.7. Polysilicic acid solutions can also be made continuously by bringing together solutions of sodium silicate and acid in a zone of intense turbulence and in such proportions that the mixture has a pH about 1.5-2.0. Residual electrolytes increase the ionic strength of the solution and result in destabilization followed by premature gelling of the polysilicic acid. Therefore, polysilicic acid formed by a method in which electrolyte by-products are produced should be separated promptly from the electrolyte by-products.

The preferred method for the preparation of polysilicic acid is by deionization of a sodium silicate solution with an ion exchange resin at room temperature. In this way the polysilicic acid solution is substantially free of electrolytes and, therefore, is more stable.

Solutions free from the sodium salt can also be obtained by hydrolyzing methyl or ethyl silicate in water at pH 2 with a strong acid as a catalyst for hydrolysis and temporary stabilizer for the silicic acid.

The aqueous solutions of polysilicic acid used in the process of this invention have a concentration of SiO$_2$ not exceeding about 6 wt %. Very low concentrations of SiO$_2$ provide even greater assurance of having the desired small particle size and stability; however, very large volumes of solution are required to supply the total amount of SiO$_2$ required by the process. It is preferred that the aqueous solutions of polysilicic acid used in the process of this invention have a concentration of SiO$_2$ not exceeding about 5 wt %.

The slurry which is spray dried is prepared by gradually adding catalyst, catalyst precursor or catalyst support particles to an aqueous silicic acid solution. The slurry is stirred until a uniform dispersion is obtained. The relative amounts of silicic acid solution and particles are chosen so that the weight of the SiO$_2$ represents 3-15% of the total weight of the particles and the SiO$_2$.

The small particle size of the silica is important not only in enabling the silica to flow to the peripheral region of the porous microsphere but also in forming the hard peripheral oxide-rich shell. Particles of silica 2-3 nm in diameter sinter together to some extent even under the temperature conditions encountered in a conventional spray drying process, whereas particles 10-100 nm do not sinter below 700-1000° C. As a result, attrition resistance of the catalyst, catalyst precursor or catalyst support particle is a function of the particle size and degree of aggreggation of the silica formed by dehydration.

Immediately following is a discussion of results realized by carrying out experiments involving the spray drying of vanadium/phosphorus oxide catalyst precursor particles and various sources of silica, to demonstrate the importance of the size of the silica particles used. It is to be understood, in this specification, that "(PSA)" following "SiO$_2$" indicates the source of the SiO$_2$ as polysilicic acid.

Discrete particles of silica 2-3 nm in diameter, such as those present in the polysilicic acid described above, form hard shells on the resulting porous microspheres under conventional drying conditions. The "green" attrition resistance, i.e., the attrition resistance before calcination, of the porous microspheres of, for example, a vanadium/phosphorus oxide catalyst precursor—10 wt % SiO$_2$ prepared using the polysilicic acid (PSA) of this invention, is as high as the attrition resistance of these microspheres after calcining at 400° C. for 1 hour. Calcination of these microspheres of vanadium/phosphorus oxide catalyst precursor—10 wt % SiO$_2$(PSA) is necessary to convert the precursor to the catalyst. However, since the "green" attrition resistance is so high, calcination can be carried out when convenient, for example when the microspheres are in the reactor.

The "green" attrition resistance of the porous microspheres of vanadium/phosphorus oxide catalyst precursor—10 wt % SiO$_2$ is significantly lower when a colloidal sol of particles of 5 nm diameter is used as the source of the silica instead of PSA. When a colloidal sol of particles of 14 nm diameter is used as the source of the silica, the "green" attrition resistance is even lower. When a colloidal sol of particles of 22 nm diameter is used as the source of the silica, significant "green" attrition resistance is not realized even when the amount of silica is increased to 20 wt %. Furthermore, calcination of the porous microspheres of vanadium/phosphorus oxide catalyst precursor—10 wt % $SiO_2$ does not result in adequate attrition resistance when the silica particle diameter in the silica source exceeds 5 nm. The attrition test results for microspheres made using a silica source with silica particles of a nominal 5 nm diameter may vary from sample to sample, probably because of the variation of particle size distribution common in such silica sols.

A solution of $Al_2O_3$ precursor that is useful in this invention is a basic aluminum chloride aqueous solution which consists of high molecular weight units or hexagonal ultimate particles about 1-2 nm in diameter. When dried and calcined, basic aluminum chloride yields aluminum oxide. The "green" attrition resistance of the porous microspheres of vanadium/phosphorus oxide catalyst precursor—10 wt % $Al_2O_3$(basic aluminum chloride) is poor in contrast to that of the vanadium/phosphorus oxide catalyst precursor —10 wt % $SiO_2$(-PSA) described above. However, calcination at 400° C. for 1 hour converts the chloride into amorphous aluminum oxide, and the peripheral alumina-rich shell confers high attrition resistance to the microspheres of V/P/O catalyst. Alumina degrades the catalyst performance and, therefore, is not the oxide of preferred choice for V/P/O catalysts.

Attrition resistance was measured using an apparatus (FIG. 1) in which the conditions are similar to but more severe than those experienced by the catalyst or catalyst support in actual operation. The apparatus is comprised of a tube 1 to contain the catalyst and, connected to this tube, a larger diameter upper section 2 which serves as an elutriator-dust collector. Means (not shown) vary the pressure and flow rate of air fed through air supply line 3 to a disc 4 containing a 0.0160 inch (0.406 mm) diameter orifice 8 opening up into a 1/16 inch (1.6 mm) hole 7.

The principle of operation involves transfer of energy from a high velocity gas jet passing through a precisely-sized orifice to catalyst particles which in turn collide with other particles. Fine particles (particles with diameters less than about 16 μm) produced from these impacts are entrained in the upward gas flow and exit the mill in exit gas flow 6. The top of the mill shown includes a 35/25 spherical joint 5 to which is attached means (not shown) for collecting the fine particles. Particles with diameters equal to or greater than about 16 μm fall back and concentrate on the outer walls of upper section 2. They agglomerate there and drop back into the tube 1 due to the action of an electro-mechanical vibrator (not shown). At elapsed times of 2, 6, 24, 48, 72 and 96 hours, the flask and filter are removed, dried at 80° C. in a vacuum oven, and weighed. The hourly rate of solids carry over is calculated, recorded and plotted. The hole in the perforated plate should be drilled to close tolerances because the attrition depends markedly on the diameter, i.e., on gas velocity. Some erosion of the holes occurs during use, and the plate must be replaced when the pressure drop through the plate deviates significantly from that obtained with a newly prepared plate under the same flow conditions. The apparatus of FIG. 1 is substantially geometrically equivalent to that described by W. L. Forsthye, Jr. and W. R. Hertwig, Ind. and Eng. Chem. 41, 1200 (1949).

The following examples are intended to demonstrate, but not limit, various embodiments of the invention. All temperatures are in degrees Celsius.

EXAMPLE 1

This is an example of the preparation and testing of a V/P/O—10% $SiO_2$(PSA) catalyst of the invention.

The preparation comprises the following steps: synthesis of the V/P/O catalyst precursor, preparation of the 5 wt % $SiO_2$ solution of polysilicic acid (PSA), preparation and spray drying of the V/P/O precursor-PSA slurry, calcination and activation.

A V/P/O catalyst precursor containing a promoter comprised of 2 weight percent $SiO_2$ and 2.5 atom percent In was prepared following Example 1 of U.S. Pat. No. 4,371,702. A 15 gallon (56.8 L) crystallizer type kettle was charged with 3600 g of comminuted $V_2O_5$, 36 L of isobutyl alcohol and 3.6 L of benzyl alcohol. The liquids were stirred while the $V_2O_5$ was added. The mixture was heated at reflux for 14 h. 1152 g of Si(OEt)$_4$ was then added and the mixture was heated at reflux for 4 h. 114 g of In metal (corresponding to 2.5 atom % In) dissolved in acetic acid and isobutyl alcohol was then added and heating at reflux was continued for 2 h. At this time an additional 3240 g of Si(OEt)$_4$ was added and the mixture was heated at reflux for 14 h. 5400 g of 85% $H_3PO_4$ were added over a 2-h period at the rate of 45 mL/10 minutes. The mixture was heated at reflux for 20 h. The slurry was filtered and the filtrate was recycled until it was clear. The solid was dried in air at 110° for two days. The solid was comminuted to a powder with particles of size between 1 and 3 μm. 7068 g of V/P/O catalyst precursor was thus produced.

A 5 wt % $SiO_2$ polysilicic acid solution was prepared by diluting 1014 g of JM grade sodium silicate solution (300 g $SiO_2$) with 4985 g of distilled water in an 8-L stainless steel beaker. The solution was stirred for a few minutes and then filtered through folded filter paper to give a clear water-like filtrate. This clear filtrate with pH of 11.3 was stirred vigorously while Dowex® HCR-W2-H resin, a strongly acidic nuclear sulfonic acid cation exchanger supplied by Dow Chemical Company, was added to reduce the pH. When the pH was about 6.8, excess resin was added to reduce the pH below 5.5 rapidly, thus avoiding microgel formation. When the pH reached 3.0±0.1, the resin was filtered off and the clear filtrate was used within an hour to prepare the V/P/O precursor-PSA slurry for spray drying.

4444 g of the 5 wt % $SiO_2$ PSA solution was added to a mixing bowl and with the mixer on low speed, 2000 g of V/P/O comminuted catalyst precursor was added in small portions over a period of 30-45 minutes. The resulting slurry, containing 34.48% solids (90% V/P/O catalyst precursor and 10% $SiO_2$), had a pH of 2.5±0.1.

The slurry was sprayed dried at the rate of 150 mL/min with atomizer area pressure set at 8 psi (55.2 kPa) and a chamber temperature of 245°±5°.

Tyler standard sieves were stacked in the order of No. 40, 60, 100, 200 and 325 along with a lid and a receiving pan and placed on a sieve shaker. 200 g of chamber product was placed on the No. 40 sieve and the sieve shaker was run for 15 minutes. Each sieve fraction was bottled and weighed separately. The amounts obtained by screening 724 g of chamber product are shown in Table 1.

TABLE 1

| Screen Sizes | Screen Opening (mm) | Amount Collected (g) | Wt. % |
|---|---|---|---|
| −40 +60 | 0.42–0.250 | 8 | 1 |

TABLE 1-continued

| Screen Sizes | Screen Opening (mm) | Amount Collected (g) | Wt. % |
|---|---|---|---|
| −60 +100 | 0.250-0.149 | 45 | 6 |
| −100 +325 | 0.149-0.044 | 596 | 82 |
| −325 | 0.044 | 74 | 10 |

Each of three 50 g samples of the −100 325 fraction was spread out in a thin layer on a fine mesh stainless steel screen on top of a quartz boat to allow air to flow under and over the sample. The three boats were placed end to end on a belt of a 3-zone, 7 foot (2.1 m)-long belt furnace. The first zone was maintained at 285°, the second at 385°, and the third at 374°. The belt speed was 0.25 inch (6.35 mm) per minute so that 4.5 hours were required for the boat to travel the length of the furnace. The combined weight of the three calcined samples was 133 g; the product was V/P/O catalyst—10% $SiO_2$(PSA).

20 g of the V/P/O catalyst—10% $SiO_2$(PSA) was tested for attrition resistance using the attrition mill and procedure described above. The results are shown in Table 2.

TABLE 2

| Cumulative Time in Mill (Hours) | % Weight Loss/Hour |
|---|---|
| 2 | 0.0751 |
| 6 | 0.0752 |
| 24 | 0.0476 |
| 48 | 0.0318 |
| 72 | 0.0385 |
| 96 | 0.0475 |

The weight of the column residue at the end of the test was 19.19 g, 96% of the catalyst weight at the start.

Sixty grams of the calcined sample was activated for 16 h at 460° in 1.5% n-butane/16% oxygen/82.5% nitrogen. The production of maleic anhydride (using a feed of 1.5% n-butane in air) was measured at temperatures ranging from 440° to 330° in a fluid bed reactor, and the results obtained are plotted in FIG. 2 on the basis of butane conversion versus selectivity for maleic anhydride, along with the results for eight other such samples (a total of nine samples, with four data points per sample). Also plotted in FIG. 2 are the results obtained after activating and testing three samples (four data points per sample) made with no addition of PSA. The same reactor and reaction conditions were used throughout. The results show that the addition of PSA has no significant effect on the butane conversion and the selectivity for maleic anhydride.

EXAMPLE 2

This is an example of the preparation of a V/P/O catalyst—5% wt % $SiO_2$(PSA) of the invention.

The slurry for spray drying was comprised of 940 g of 5 wt % $SiO_2$ solution of PSA (47 g $SiO_2$) and 900 g of the comminuted V/P/O catalyst precursor described in Example 1. The pH was 2.35 and the concentration of solids was 51.4%.

Conditions for spray drying were the same as used in Example 1. The yield in the chamber was 423 g, and in the cyclone 256 g, for a total of 679 g (72% total yield).

The chamber product was screened and 150 g of the −100 +325 fraction were calcined in the belt furnace under the same conditions used in Example 1.

65 g of the calcined product was fluidized for one week in 1.5% n-butane/98.5% air at 440° and then 20 g of this product was tested for attrition resistance using the apparatus and procedure described above. The attrition test results of the calcined sample and the sample treated in butane/air for one week are plotted in FIG. 3. The results show that the calcined V/P/O catalyst—5% wt % $SiO_2$(PSA) composition has poor attrition resistance and that it becomes greatly improved by longer thermal treatment in butane.

60 g of the calcined product was activated in the fluid bed reactor in nitrogen containing 1.5% n-butane and 16% oxygen at 460° for 16 h and tested for activity and selectivity to maleic anhydride. The activity-selectivity tests showed that the V/P/O catalyst—5% wt % $SiO_2$(PSA) is an excellent catalyst for the selective oxidation of n-butane to maleic anhydride.

EXAMPLE 3

This is an example of the preparation and testing of a colloidal silica (22 nm particle size)—10 wt % $SiO_2$ (PSA) catalyst support of the invention.

1688 g of Ludox ® AS-40 (commercially available) containing 675 9 of $SiO_2$ (a silica sol with particle size of 22 nm and 40 wt % $SiO_2$), was added to 1500 g of 5 wt % $SiO_2$ polysilicic acid solution (75 g $SiO_2$) prepared as described in Example 1, and this mixture was spray dried under the same conditions used in Example 1. The yield was 398 g (chamber) and 248 g (cyclone), for a total yield of 646 g (85.9%).

For comparison, 2000 g of Ludox ® AS-40 containing 800 g of $SiO_2$ (a silica sol with particle size of 22 nm and 40 wt % $SiO_2$) was spray dried under the same conditions used in Example 1. The yield was 468 g (chamber) and 276 g (cyclone), for a total yield of 744 g (93%).

Each of the above spray dried products was screened as described in Example 1 and the −100 +325 fraction of each product was calcined as described in Example 1. 20 g of each calcined product was tested for attrition resistance. The attrition test results for Ludox ® (22 nm) and for Ludox ® (22 nm)—10 wt % $SiO_2$ (PSA) are shown in FIG. 4. The results show that the product of this invention Ludox ® (22 nm)—10 wt % $SiO_2$ (PSA) has greatly improved attrition resistance over that of Ludox ® (22 nm).

EXAMPLE 4

This is an example of the preparation and testing of a colloidal silica (7 nm particle size)—10 wt % $SiO_2$ (PSA) catalyst support of the invention.

Commercially available Ludox ® SM (7 nm paricle size) was deionized with cationic resin in H+form before it was used.

3000 g of deionized Ludox ® SM (pH 2.5) containing 900 g of $SiO_2$ (a silica sol with particle size of 7 nm and 30 wt % $SiO_2$) was added to 2000 g of 5 wt % $SiO_2$ polysilicic acid solution (100 g $SiO_2$), prepared as described in Example 1, and this mixture was spray dried under the same conditions used in Example 1 to obtain Ludox ® (7 nm)—10 wt % $SiO_2$ (PSA).

For comparison, 2000 g of deionized Ludox ® SM containing 600 g of $SiO_2$ (a silica sol with particle size of 7 nm and 30 wt % $SiO_2$) was spray dried under the same conditions used in Example 1.

Each of the above spray dried products was screened as described in Example 1 and the −100+325 fraction of each product was calcined in the belt furnace used in Example 1. Each was calcined at about 400° in still air for 1 h. 20 g of each of the calcined products was tested for attrition resistance. The attrition test results for Ludox® (7 nm) and for Ludox® (7 nm)—10 wt % SiO₂ (PSA) are shown in FIG. 5. At the conclusion of the 96 h test, there was a residue of 70 wt % Ludox® (7 nm) and 87 wt % Ludox® (7 nm) —10 wt % SiO₂ (PSA). The results show that the product of this invention Ludox® (7 nm)—10 wt % SiO₂ (PSA) has greatly improved attrition resistance over that of Ludox® (7 nm).

Two samples of the spray dried Ludox® (7 nm)—10 wt % SiO₂ (PSA) were calcined as above except that the calcination temperatures were 600° and 800°, respectively. When tested for attrition resistance using the apparatus and procedure described above, these samples had residues of 98.5 wt % and 98.75 wt %, respectively, showing that the attrition resistance of Ludox® (7 nm)—10 wt % SiO₂ (PSA) can be increased with higher temperature calcinations.

EXAMPLE 5

A 49.12 weight % aqueous slurry of comminuted V/P/O catalyst precursor as described in Example 1 was made following the procedure given in Example 1 but using water instead of a PSA solution. More specifically, 1100 g of comminuted V/P/O catalyst precursor was dispersed in 1140 g of water. 2105 g of the slurry was spray dried under the same conditions of Example 1 and gave a yield of 502 g (48.7%) of chamber product and 229 g (22.1%) of cyclone product, for a total of 731 g.

Screening of the chamber product produced the following fractions:

TABLE 3

| Screen Sizes | Screen Opening (mm) | Amount Collected (g) | Wt. % |
|---|---|---|---|
| +80 | 0.177 | 60 | 12.5 |
| −80 +100 | 0.177–0.149 | 93 | 19.3 |
| −100 +325 | 0.149–0.044 | 282 | 58.6 |
| −325 | 0.044 | 46 | 3.6 |

100 g of the −100 +325 product was calcined in a belt furnace under the conditions given in Example 1.

The calcined product was tested for attrition resistance using the procedure of Example 1 and the results obtained are plotted in FIG. 6. V/P/O catalyst precursor from the same batch as that used above was used to prepare V/P/O catalyst—10 wt % SiO₂(PSA) as described in Example 1 and the calcined product was tested for attrition resistance using the procedure of Example 1. The results obtained are also plotted in FIG. 6 to compare calcined V/P/O catalyst versus calcined V/P/O catalyst—10 wt % SiO₂(PSA) of the invention.

EXAMPLES 6 TO 9

These are experiments in which 10 to 20 wt % SiO₂ was added to V/P/O catalysts in the form of colloidal silica and fumed silica instead of PSA and show the importance of following the teachings of the instant invention in choosing the particle size of the oxide precursor in the slurry. V/P/O catalyst precursor was made following the procedure given in Example 1. Commercially available Ludox® colloidal silica of three differnt particle sizes, Ludox® SM—7 nm (Example 6), Ludox® AS—14 nm (Example 7), and Ludox® TM—22 nm (Example 8), and Cabosil® fumed silica S-17 (Example 9) were used as sources of SiO₂. The attrition resistances of these products were compared with that of the V/P/O catalyst—10 wt % SiO₂(PSA) of Example 1 of this invention.

Ludox® was deionized before using to eliminate sodium from the liquid-phase. The slurry was made by the same procedure used in Example 1. For the case of fumed silica the slurry was made by dispersing the fumed silica in water and then adding the comminuted V/P/O catalyst precursor as in Example 1.

The spray drying conditions were the same as used in Example 1, and the −100 +325 mesh fractions were used for testing as in Example 1.

The calcination conditions and attrition test conditions were the same as those used in Example 1 except for the sample made with Ludox® colloidal silica of 22 nm particle size. This sample had extremely poor attrition resistance after calcination. To try to improve attrition resistance the sample was heated at 440° for one week in 1.5% n-butane in air and tested in the attrition mill.

Figure 8:
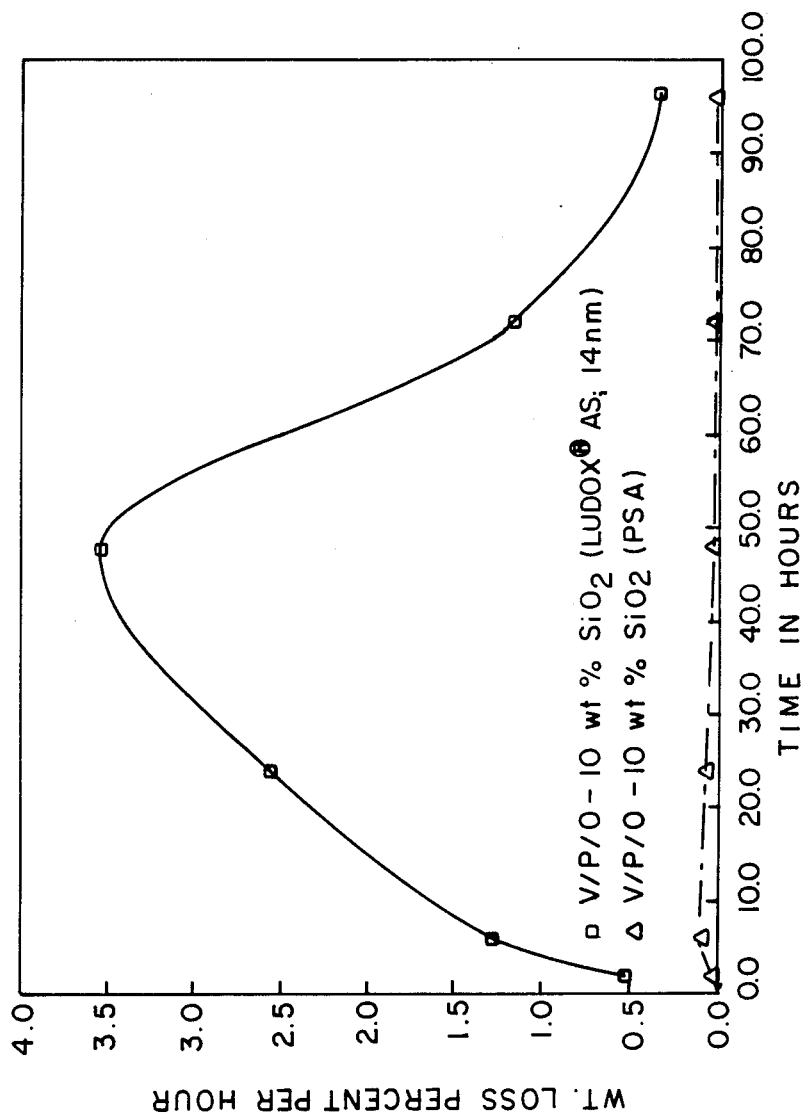
FIG. 8 shows the results of attrition mill tests for V/P/O catalyst—10 wt % $SiO_2$(14 nm particle size Ludox ® AS) and V/P/O catalyst—10 wt % $SiO_2$(PSA). Weight loss percent per hour is plotted versus time in hours.
Figure 9:
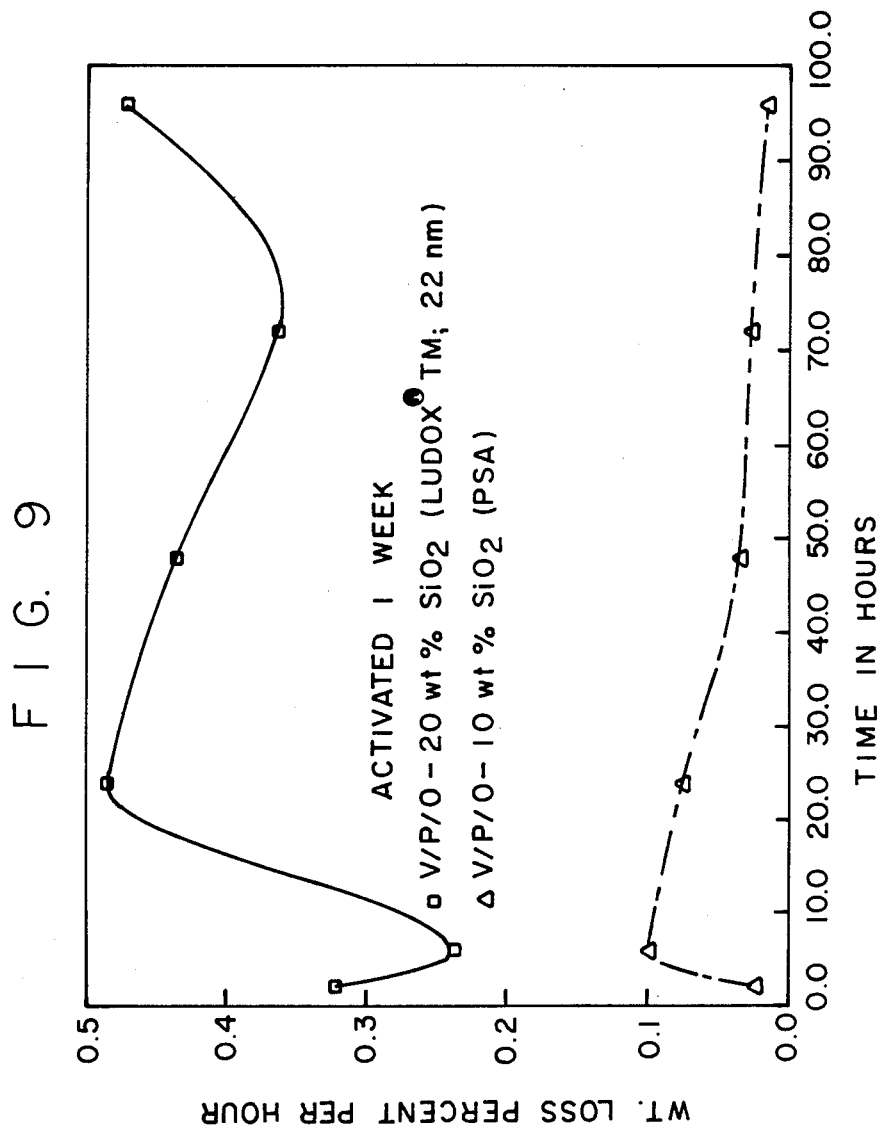
FIG. 9 shows the results of attrition mill tests for V/P/O catalyst—20 wt % $SiO_2$(22 nm particle size Ludox ®) and V/P/O catalyst—10 wt % $SiO_2$(PSA). Weight loss percent per hour is plotted versus time in hours.
Figure 10:
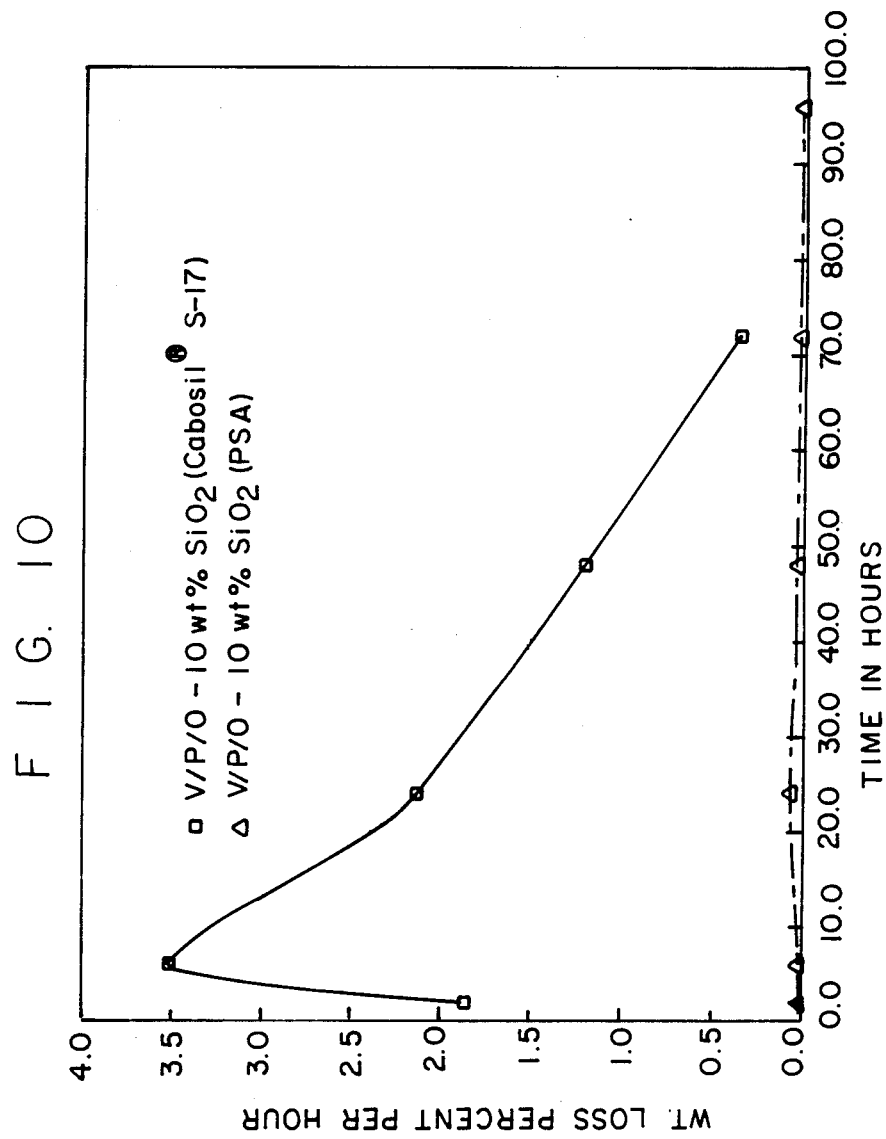
FIG. 10 shows the results of attrition mill tests for V/P/O catalyst—10 wt % $SiO_2$(Cabosil ® S-17) and V/P/O catalyst—10 wt % $SiO_2$(PSA). Weight loss percent per hour is plotted versus time in hours.

Attrition test results are plotted in FIGS. 7–10 for each of these four samples. V/P/O catalyst precursor from the same batch as that used above was used to prepare V/P/O catalyst—10 wt % SiO₂(PSA) as described in Example 1 and the calcined product was tested for attrition resistance using the procedure of Example 1. The results obtained with the V/P/O catalyst—10 wt % SiO₂(PSA) are plotted in the Figures for comparison.

Characteristics and yields of the various materials of Examples 6 to 9 are shown in Table 4.

TABLE 4

| Silica source | 6 Ludox ™ SM | 7 Ludox ™ AS | 8 Ludox ™ TM | 9 Cabosil S-17 |
|---|---|---|---|---|
| % Silica in V/P-SiO₂ catalyst | 10 | 10 | 20 | 10 |
| Silica particle size, nm | 7 | 14 | 22 | 7 |
| % SiO₂ in silica source | 30 | 40 | 30 | 100 |
| pH after deionization | 2.7 | 2.9 | 2.0 | — |
| Amount of deionized Ludox ® used, g | 250 | 250 | 1000 | — |
| Amount of Cabosil ® used, g | — | — | — | 75 |
| Amount of water used, g | 575 | 575 | 300 | 835 |
| Amount of micronized vanadyl phosphate used, g | 657 | 675 | 1200 | 675 |
| % Solids in slurry for spray drying | 50 | 50 | 60 | 47.3 |
| Spray dried yield chamber | 394 | 338 | 816 | 450 |
| cyclone | 231 | 250 | 308 | 101 |
| Screening yields (chamber | | | | |

TABLE 4-continued

| Silica source | 6<br>Ludox TM SM | 7<br>Ludox TM AS | 8<br>Ludox TM TM | 9<br>Cabosil S-17 |
|---|---|---|---|---|
| product) | | | | |
| 40 + 60 | 3 g (0.8%) | 3 g (1%) | 83 g (10.4%) | 26 g (6%) |
| 60 + 100 | 29 g (7.7%) | 14 g (4.5%) | 181 g (22.7%) | 107 g (24.7%) |
| 100 + 325 | 29 g (77.5%) | 232 g (74.6%) | 659 g (60%) | 271 g (6.26%) |
| 325 | 52 g (13.9%) | 62 g (20%) | 54 g (6.8%) | 29 g (6.7%) |

EXAMPLE 10

This is an Example of the preparation and testing of a a multicomponent molybdate (MCM) —10% $SiO_2$(-PSA) catalyst of the invention.

The multicomponent molybdate was prepared as follows. A solution of 266.4 g of $Co(NO_3)_2$ and 147.88 g of $Ni(NO_3)_2$ in 500 mL of distilled $H_2O$, pH=3.66, was added to a solution of 467 g of $(NH_4)_6Mo$ in 3250 mL of distilled $H_2O$, pH=4.11. A solution of 246.48 g of Fe(-$NO_3)_3$ in 300 mL of distilled $H_2O$, pH=1.72 was added to the solution prepared above. A thick yellow precipitate formed. The slurry was stirred for about 30 minutes. A solution of 98.7 g of $Bi(NO_3)_3$ in 600 mL of dilute $HNO_3$ (60 mL $HNO_3$ diluted to 600 mL with $H_2O$) was added to the slurry. There was no change in appearance and the slurry was stirred for about 30 minutes. A solution of 52.12 g of $Mg(NO_3)_2$ and 2.06 g of $KNO_3$ in 100 mL of distilled $H_2O$ was added to the slurry and there was no change in appearance. 5.8 mL of $H_3PO_4$ was added to the slurry. The slurry was stirred and heated to evaporate water until the volume was reduced to 1500 mL. The slurry then contained about 40% solids and the pH was less than 1. The weight of the thick, bright yellow slurry was 2450 g. The slurry was centrifuged at 2000 rpm in four 250 mL centrifuge bottles for 1 h. The supernatant (69 g) was discarded and the slurry was used to prepare the multicomponent molybdate—10 wt % $SiO_3$(PSA) catalyst of the formula

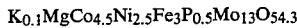
$K_{0.1}MgCo_{4.5}Ni_{2.5}Fe_3P_{0.5}Mo_{13}O_{54.3}$ 1056 g of the multicomponent molybdate slurry was thoroughly mixed with 1500 g of 5 wt % $SiO_2$ polysilicic acid solution (75 g $SiO_2$). The resulting slurry contained about 20% solids. The slurry was spray dried under the same conditions used in Example 1 and dried for about 16 h in a vacuum oven at about 100°. The porous microspheres were then calcined in a muffle furnace by heating from room temperature to 200° in 1 h, holding the temperature at 200° for 2 h, heating to 300° in 1 h, holding the temperature at 300° for 3 h, heating to 400° in 1 h, holding the temperature at 400° for 2 h, heating to 550° in 90 minutes and holding the temperature at 550° for 20 h. The weight loss during calcination was 3.5%.

20 g of the calcined product, multicomponent molybdate—10 wt % $SiO_2$(PSA) catalyst, was tested for attrition resistance using the apparatus and procedure described above. The attrition test results are plotted in FIG. 11. The attrition test results for a multicomponent molybdate catalyst containing about 50 wt % $SiO_2$(colloidal silica), the $SiO_2$ dispersed substantially uniformly throughout the composite particles, are also shown for comparison. The attrition resistances are comparable despite the fact that the catalyst prepared by the process of this invention contains only 1/5 as much $SiO_2$.

The calcined catalyst was treated first with aqua regia and then with 50% $H_2SO_4$ to dissolve the multiple component molybdate. The remaining silica shell was observed using scanning electron microscopy and the thickness of the shell was between 5 and 10 μm.

The multicomponent molybdate—10 wt % $SiO_2$(-PSA) catalyst showed good catalytic performance in a conventional process for making acrylonitrile from propylene and ammonia.

BEST MODE FOR CARRYING OUT THE INVENTION

The best mode presently contemplated for carrying out the invention is demonstrated and/or represented by the embodiments wherein polysilicic acid (PSA) is used as the oxide precursor.

INDUSTRIAL APPLICABILITY

The industrial applicability of the highly attrition resistant catalysts, catalyst precursors and catalyst support particles of this invention will be readily realized by one skilled in the art of carrying out catalyzed chemical reactions. The backgrund section of this specification includes a discussion of publications which are representative of some of these reactions.

Although preferred embodiments of the invention have been illustrated and described hereinabove, it is to be understood that there is no intent to limit the invention to the precise constructions herein disclosed, and it is to be further understood that the right is reserved to all changes and modifications coming within the scope of the invention defined in the appended claims.

What is claimed is:

1. Process for the production of attrition resistant catalyst or catalyst support particles have an oxide-rich surface layer, the process comprising:
   (a) forming a slurry comprised of catalyst, catalyst precursor or catalyst support particles dispersed in a solution of a solute which consists essentially of said oxide precursor of particle size no greater than 5 nm, the relative amounts of the particles and oxide prcursor chosen so that the weight of the oxide formed steps (b) and/or (c) is about 3–15% of the total weight of the particles and the oxide formed; and
   (b) spray drying the slurry to form porous microspheres of attrition spheres of attrition resistant catalyst, catalyst precursor or catalyst support particles; and
   (c) calcining the spray dried microspheres at an elevated temperature which is below the temperature which is substantially deleterious to the catalyst or catalyst support, to produce attrition resistant catalyst or catalyst support particles having said oxide-rich surface layer.

2. Process of claim 1 wherein said oxide-rich surface layer is $SiO_2$ and the solution of solute is aqueous silicic acid solution equivalent to a weight of $SiO_2$ not exceeding 6 wt %.

3. Process of claim 2 wherein the silicic acid is polycilicic acid.

4. Process of claim 2 further comprising:
(a) forming a slurry comprised of vanadium/phosphorus oxide catalyst precursor particles dispersed in an aqueous silicic acid solution equivalent to a concentration of $SiO_2$ not exceeding about 6 wt %, the relative amounts of the particles and silicic acid chosen so that the weight of the $SiO_2$ is about 10–15% of the total weight of the particles and the $SiO_2$;
(b) spray drying the slurry to form porous microspheres; and
(c) calcining the spray dried microspheres at an elevated temperature which is below the temperature which is substantially deleterious to the catalyst, to produce attrition resistant, $SiO_2$-containing vanadium/phosphorus oxide catalyst particles having said oxide-rich surface layer.

5. Attrition resistant catalyst or catalyst support particles having an oxide-rich surface layer and prepared by the process of claim: 1.

6. Attrition resistant catalyst or catalyst support particles having an oxide-rich surface layer and prepared by the process of claim 3.

7. Attrition resistant, $SiO_2$-containing vanadium/phosphorus oxide catalyst particles having an oxide-rich surface layer and prepared by the process of claim 4.

8. Attrition resistant, $SiO_2$-containing multicomponent molybdate particles having an oxide-rich surface layer and prepared by the process of claim 1.

* * * * *